Dec. 24, 1968        H. SCHMITT        3,418,479
EXPOSURE INDICATION CIRCUIT FOR ELECTRONIC SHUTTER DEVICES
Filed Oct. 7, 1965
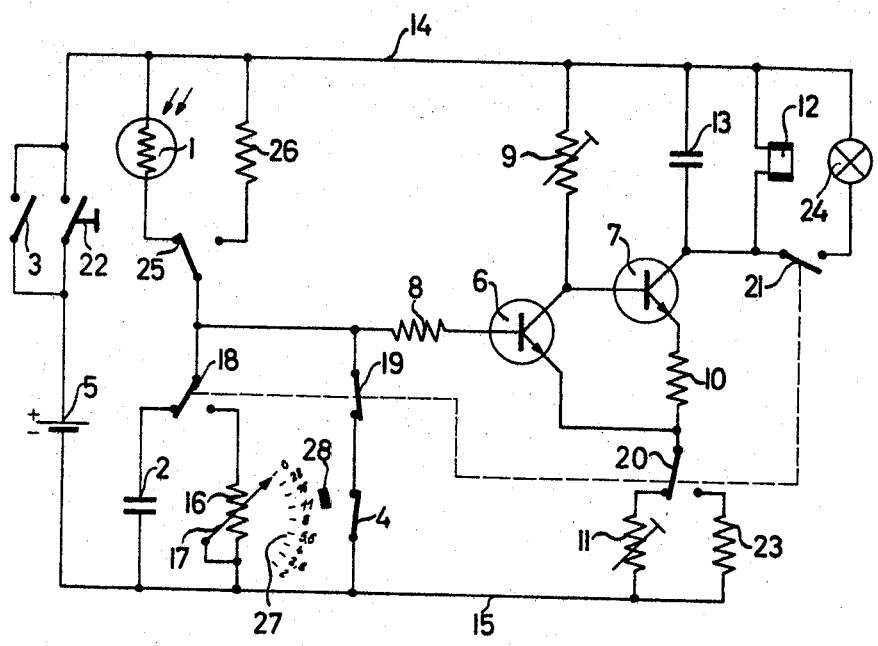
Inventor
HELMUT SCHMITT
By: Nolte & Nolte
ATTORNEYS

United States Patent Office 3,418,479
Patented Dec. 24, 1968

3,418,479
EXPOSURE INDICATION CIRCUIT FOR ELECTRONIC SHUTTER DEVICES
Helmut Schmitt, Hausen, Bavaria, Germany, assignor to P. Gossen & Co. G.m.b.H., Erlangen, Bavaria, Germany
Filed Oct. 7, 1965, Ser. No. 493,846
Claims priority, application Germany, Mar. 26, 1965, G 43,185
5 Claims. (Cl. 250—206)

ABSTRACT OF THE DISCLOSURE

In an automatic shutter control circuit having a voltage source, a photoresistor-capacitor circuit and a Schmitt trigger circuit coupled to the latter circuit to control a shutter setting device, there are provided a potentiometer, switching means mechanically coupled to the slider arm of the potentiometer and a signalling device. When the slider arm is displaced from its starting position, the switching means selectively connects the potentiometer to the photoresistor and, at the same time, the signalling device is also connected to the output of the Schmitt trigger. The signalling device gives a signal when the position of said slider arm, which is calibrated in exposure values defines a threshold voltage dependent on the light condition existing on the photoresistor.

---

The invention relates generally to electronically operated shutter devices and more particularly to an arrangement for controlling the operation of a shutter device in which a photoelectrically operated holding magnet controls the magnitude of the opening of the shutter device or the exposure time thereof.

Known types of shutter devices do not possess indicating means in which the deflection of a pointer would furnish an indication of the shutter position or exposure time required under given light conditions or which furnish indications regarding the state of the associated battery.

It is important while using cameras which employ electrically controlled shutter devices, that data regarding shutter position or exposure time for given light conditions be available prior to the taking of the picture, as well as information of the condition of the battery voltage, since a low battery voltage may cause a loss of control of the entire picture taking process.

It is an object of this invention to provide an improved arrangement for indicating the light condition prior to the operation of a shutter.

It is a further object of the subject invention to provide an improved control arrangement capable of furnishing indication of the required shutter position or exposure time under given light conditions.

It is still a further object of the subject invention to provide an arrangement capable of furnishing information as to the conditions of the battery associated with a camera.

A control arrangement which is capable of meeting the above requirements comprises, in accordance with the invention, a potentiometer which is specially designed for the purpose, a source of potential, a signal lamp, the potentiometer and the signal lamp being adapted to be selectively connectable to the source of potential by switching means, the potentiometer being further arranged for selective connection to a light sensitive device or to a circuit portion at one side of the source of potential. Also provided is a pointer operatively connected with a slider arm of the potentiometer and which is adapted to indicate on an associated scale the shutter position or the exposure time required under the given light conditions, and which also furnishes indication as to the conditions of the source of potential with respect to a control mark characteristic of a potential level of the source of potential, whereby upon movement of the slider arm to a position having a predetermined resistance value associated therewith, will, in cooperation with the light sensitive device, extinguish the signal lamp.

The potentiometer is constructed so that it is maintained in a rest position by a spring, the rest position coinciding with a "zero" mark on the associated scale and, that switching means are coupled for actuation by an axis of rotation of the potentiometer for connecting the potentiometer and the signal lamp into the control arrangement whenever the potentiometer leaves the "zero" position thereof.

The invention will become more readily apparent from the following description of a preferred embodiment thereof shown, by way of example, in the accompanying drawing in which:

The single figure is a diagrammatic representation of the control arrangement in accordance with the invention.

With reference to the single figure, a light sensitive device 1, such as a photo-resistor, having an associated capacitor 2 insertable therewith in a series branch circuit across a source of D.C. potential 5 by means of a contact arm 3, having auxiliary keying contact 22 parallel therewith, represents an input to a Schmitt-trigger arrangement. The Schmitt-trigger circuit comprises semi-conductor devices such as transistors 6 and 7, which are capable of switching between a conducting and non-conducting state. The Schmitt-trigger circuit further includes biasing and load resistors 8, 9, 10 and 11.

At the output of the Schmitt-trigger circuit lies an electromagnet 12 shunted by a capacitor 13 for operating the shutter device of the photo apparatus, such as more fully described in my co-pending applications Ser. No. 474,697 filed July 26, 1965, and Ser. No. 474,050, filed July 22, 1965, now Patent No. 3,295,498, both assigned to the same assignee as the instant application. The supply voltage for the Schmitt-trigger circuit is derived from the source of potential 5, preferably a battery, through conductors 14 and 15. For purposes hereinafter described, potentiometer means 16 is provided in the circuit. Potentiometer 16 comprises a slider arm having a pointer 17 integral therewith mounted on one end portion thereof. The slider arm is mounted for rotation about an axis of the potentiometer means 16 in slidable contact therewith. Switching means 18, 19, 20 and 21 are mounted at the other end portion of the axis of the potentiometer means. The potentiometer axis has associated therewith spring means, preferably a coil spring (not shown in the drawing), for biasing the slider arm together with pointer 17 to a starting position, i.e. to a position where the pointer points to the zero mark. Switching means 18, 19, 20 and 21 are so coupled with the axis of rotation of the potentiometer means that they assume the respective positions shown in the drawing at the above-mentioned "zero" position of the potentiometer means. Any other position of the potentiometer means causes the switching means to switch. When switching means 18 is switched from its position shown in the drawing, potentiometer means 16 becomes inserted into the circuit while capacitor 2 is removed therefrom. The switching of contact means 20 removes variable resistor 11 and inserts fixed matching resistor 23 into the Schmitt trigger circuit to match the latter to signal lamp. Operating switching means 21 places signal lamp 24 in parallel with the magnet 12. Operation of switching means 25 removes the light sensitive device 1 from the circuit and inserts a fixed testing resistor 26 therein for battery supervision purposes as hereinafter described.

The control arrangement of the subject invention effects shutter and exposure controls in certain positions of its associated switching means, while switching means 3 is transferred to its closed position upon actuation of the camera trigger means.

In order to obtain preliminary information as to shutter positions for respective exposure times, first keying contact arm 22 is transferred to its closed position bringing battery 5 into the circuit. An operating knob (not shown on the drawing) associated with potentiometer means 16 will be turned against the force of the above-mentioned coil spring (not shown). The smallest rotation of the operating knob will cause switching means 18, 19, 20 and 21 to switch, upon which signal lamp 24 will light up since transistor 7 is in the conduction state. A further turning of the operating knob is accompanied by an increasing voltage drop on potentiometer means 16 which voltage drop, in cooperation with the light-sensitive resistance of photo-device 1, will reach a threshold level which causes the transistor devices to switch. Upon reaching such level on potentiometer 16, transistor device 6 becomes conductive which condition turns off transistor 7. Non-conduction of transistor 7 causes signal lamp 24 to extinguish which gives an indication that pointer 17 is in its correct position and the value on scale 27 associated with such position represents the shutter position or exposure time required under the existing light conditions.

Should the shutter device comprise an electronically controlled diaphragm, as shown in the drawing, and described in more detail in the above referred co-pending applications, a potentiometer having linear resistance characteristics will be sufficient.

The invention also provides that for a shutter arrangement, in which the exposure time is automatically controlled, and in which the value of the resistance of photo-resistor 1 logarithmically changes as a function of the incoming light intensity, the potentiometer should also have logarithmic resistance characteristics so that correct readings could be obtained from the time scale which replaces the shutter position scale in such embodiment.

Combination of both shutter position and exposure time control in a single device is readily apparent from the described principles of the invention.

A test of the battery conditions is performed by the actuation of switching means 25 which, as pointed out above, removes photo-resistor 1 from the circuit and inserts resistor 26 thereinto. Potentiometer 16 is again turned from the "zero" position thereof toward the above described voltage level till signal lamp 24 is turned off. The criterion of sufficient battery voltage resides in the position of pointer 17 within mark 28 at the instant of extinction of signal lamp 24.

Although the invention has been described with reference to a specific embodiment thereof, it is not intended that the invention be limited to such specific embodiment, but defined by the scope of the appended claims.

What I claim is:

1. In an arrangement for electronic exposure control for a camera comprising a power source coupled with a light sensitive circuit including resistive and capacitive means, a trigger circuit actuated by a predetermined threshold voltage, the input of said trigger circuit being connected to said light sensitive circuit, and a shutter device controlled by the output of said trigger circuit, the combination comprising: a variable resistance means including a control member having a starting position; first switching means mechanically coupled with said control member, a signalling device controllable by said trigger circuit; said switching means alternatively connecting said capacitive means and said variable resistance means to said light sensitive resistive means and connecting said signalling device to the output of said trigger circuit when said control member is displaced from said starting position; and the displacement of said control member being calibrated to indicate prior to the exposition of said camera the light condition when a threshold voltage on said variable resistance means and said light sensitive circuit has been adjusted and thereby the signalling device actuated.

2. The combination according to claim 1, further comprising a fixed testing resistor connected to said power source, second switching means alternatively connecting said light sensitive resistive means and said fixed testing resistor means to said variable resistance means, the displacement of said control member being further calibrated to indicate the voltage level of said power source.

3. The combination according to claim 1, wherein said first switching mean alternatively connects a fixed matching resistor to said trigger circuit to match the latter to said signalling device.

4. The combination according to claim 2, wherein said variable resistance means is a potentiometer having a movable slider arm provided with a pointer, said pointer being associated with a scale means calibrated both in exposure values and in operating voltage values of said power source.

5. The combination as claimed in claim 4, wherein said potentiometer further comprises biasing means for biasing said slider arm to said zero position of a scale means.

References Cited

UNITED STATES PATENTS

| | | | |
|---|---|---|---|
| 2,971,134 | 2/1961 | Cockrell | 317—124 |
| 3,159,755 | 12/1961 | Duncan | 307—88.5 |
| 3,231,787 | 1/1966 | Knudson | 317—148.5 |
| 3,319,116 | 5/1967 | Schick | 315—159 X |
| 3,347,141 | 10/1967 | Nobusawa et al. | 250—206 X |

JAMES W. LAWRENCE, *Primary Examiner.*

C. R. CAMPBELL, *Assistant Examiner.*

U.S. Cl. X.R.

307—311; 317—148.5; 315—159; 88—23

UNITED STATES PATENT OFFICE
CERTIFICATE OF CORRECTION

Patent No. 3,418,479                        December 24, 1968

Helmut Schmitt

It is certified that error appears in the above identified patent and that said Letters Patent are hereby corrected as shown below:

Column 4, line 4, after "shutter" insert -- setting --.

Signed and sealed this 10th day of March 1970.

(SEAL)
Attest:

Edward M. Fletcher, Jr.              WILLIAM E. SCHUYLER, JR.
Attesting Officer                      Commissioner of Patents